United States Patent [19]

Baba

[11] Patent Number: 4,729,185

[45] Date of Patent: Mar. 8, 1988

[54] DISPLAY PANEL ILLUMINATION DEVICE

[75] Inventor: Masaharu Baba, Yokohama, Japan

[73] Assignee: Kabushiki Kaisha Toshiba, Kawasaki, Japan

[21] Appl. No.: 823,391

[22] Filed: Jan. 28, 1986

[30] Foreign Application Priority Data

Jan. 30, 1985 [JP] Japan .............. 60-11846[U]

[51] Int. Cl.⁴ .................................. G09F 13/18
[52] U.S. Cl. .............................. 40/546; 362/31
[58] Field of Search .............. 40/547, 546; 362/26, 362/31; 350/96.28

[56] References Cited

U.S. PATENT DOCUMENTS

| | | | |
|---|---|---|---|
| 3,043,948 | 7/1962 | Albinger, Jr. et al. | 362/31 |
| 3,737,644 | 6/1973 | Nocek et al. | 40/546 |
| 3,968,584 | 7/1976 | Kingston | 40/546 |
| 4,059,916 | 11/1977 | Tachihara et al. | 40/546 |
| 4,294,507 | 10/1981 | Johnson | 350/96.18 |
| 4,321,655 | 3/1982 | Bouvrande | 362/31 |
| 4,555,694 | 11/1985 | Yanagishima et al. | 40/546 |

FOREIGN PATENT DOCUMENTS

| | | |
|---|---|---|
| 1995520 | 3/1965 | Fed. Rep. of Germany . |
| 2310715 | 9/1974 | Fed. Rep. of Germany . |
| 7620172 | 6/1976 | Fed. Rep. of Germany . |
| 2529286 | 11/1976 | Fed. Rep. of Germany . |
| 2536504 | 5/1984 | France ................ 362/26 |
| 1166442 | 10/1969 | United Kingdom . |

Primary Examiner—Robert Peshock
Assistant Examiner—Cary E. Stone
Attorney, Agent, or Firm—Cushman, Darby & Cushman

[57] ABSTRACT

A display panel illumination device has a display member for transmitting predetermined information, a light source for illuminating the display member, and a light guiding member for guiding light emitted from the light source to the display member. The light guiding member is made of a flexible transparent or translucent material.

5 Claims, 8 Drawing Figures

F I G. 7
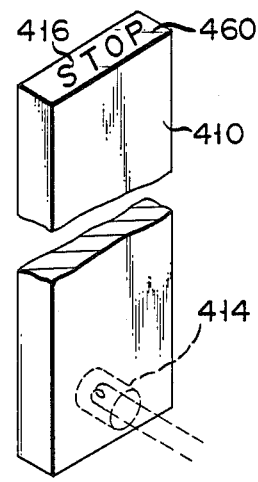
F I G. 8
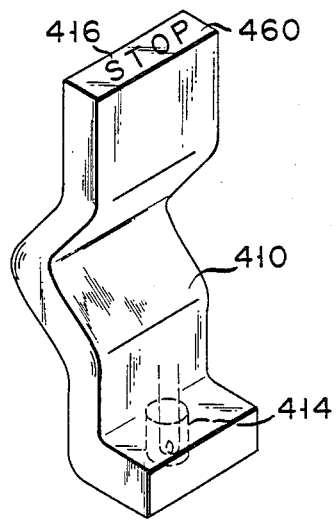

DISPLAY PANEL ILLUMINATION DEVICE

BACKGOUND OF THE INVENTION

The present invention relates to a surface illumination device for a display panel, suitable for rear surface illumination such as a liquid crystal display panel.

Illumination devices are installed in motor vehicles and airplanes to emit light from the rear of display panels to illuminate patterns of characters and figures. Obviously, for purposes of complete illumination, the illumination device must be capable of satisfactorily illuminating an area corresponding to the total area of the display panel.

A conventional display panel illumination device is illustrated in FIG. 1. In this conventional device, lamp insertion hole 12 is formed in, for example, a portion of an end of the rear or lower surface of transparent or translucent light guiding member 10 which is made of, for example, acrylic resin and which has a predetermined area. Baseless, compact, incandescent lamp 14 is inserted into hole 12. Light rays emitted from lamp 14 are guided through member 10 from its rear surface to its front surface where, member 10 being in contact with display panel 16, the light rays illuminate the characters and figures on display panel 16. The lower or rear surface of member 10 curves away from lamp 14 in the direction of panel 16 and, in this way, ensures uniform illuminance through its front, or upper surface. Curved surface 18 of member 10 is a reflecting or satin finish surface formed by sand blasting.

Because conventional member 10 is made of a highly rigid material such as acrylic resin, it is both susceptible to easy deformation by heat and, owing to its lack of flexibility and elasticity, the cause of a decrease in illuminance between itself and the display panel. Its easy deformation by heat necessitates that a sufficiently large lamp insertion hole be formed in member 10 to ensure that the lamp nowhere contacts the acrylic resin and that a cooling space be formed between lamp 14 and the substance of which member 10 is composed. Its lack of flexibility and elasticity necessitates that it be specifically molded to suit the shape of specific display panels.

In order to increase the field of view of display panel 16, an arcuated display panel, denoted by reference number 16a and illustrated by means of solid lines in FIG. 2, is often formed. Because of its inflexibility, when conventional member 10 is used together with panel 16a, a small space that diminishes the illuminance of the light as it passes from the front or upper surface of member 10 to panel 16a is the result.

As a means of eliminating this space and maintaining the desired uniform illuminance, the front surface of member 10 can be molded such that it can be brought into tight apposition with the arcuated surface of panel 16a. Naturally, however, when panels such as dashed line illustrated panel 16b, provided for a different purpose and having a different radii of curvature from that of panel 16a are used, they must each be provided with their own specifically molded light guiding members. This necessity, of course, in that it calls for the provision of many different molding dies by which to form the variously required light guiding members, merely complicates and impedes the efficiency with which display panel illumination devices can be manufactured.

SUMMARY OF THE INVENTION

It is a first object of the present invention to provide a display panel illumination device, whereby optimal display illumination can be obtained even if a display panel's radius of curvature varies or if the illumination direction varies somewhat.

It is a second object of the present invention to provide an illumination device whose effectiveness will not be reduced even though the device is installed in a complicated and bent path.

In order to achieve the above and other objects of the present invention, there is provided a display panel illumination device comprising a display member for transmitting predetermined information; a light source for illuminating the display member; and a light guiding member for guiding light from the light source to the display member, the light guiding member being made of a flexible transparent or translucent material.

The light guiding member cited as being a part of the above arrangement has the following advantages over the conventional light guiding member. In that it is composed of a flexible material, the light guiding member of the present invention can be bent in accordance with a display panel's radius of curvature and, moreover, bent and deformed to effect a change in the direction in which light emitted by the lamp is transmitted. As a result, a variety of differently curved light guiding members need not be manufactured, reducing both the complexity and the cost of manufacture.

BRIEF DESCRIPTION OF THE DRAWINGS

Other objects and advantages will be apparent from the following description when taken in conjunction with the accompanying drawings, in which:

FIGS. 7 and 8 are perspective views of a display panel illumination device according to a fourth embodiment of the present invention.

DETAILED DESCRIPTION OF THE PREFERRED EMBODIMENTS

Figure 1:
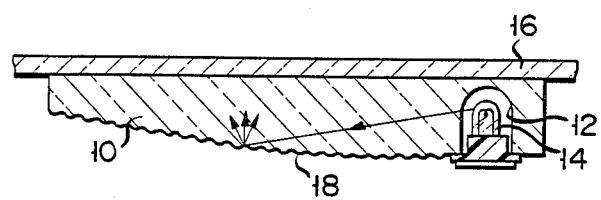
FIG. 1 is a sectional view of a conventional display panel illumination device.
Figure 2:
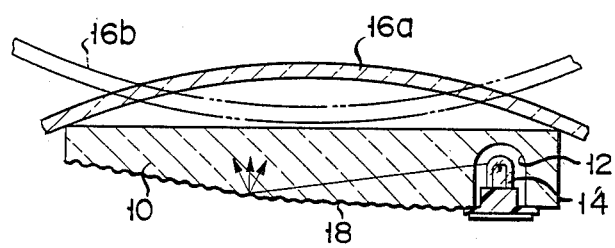
FIG. 2 is a sectional view of a conventional display panel illumination device which has an arcuated display panel.
Figure 3:
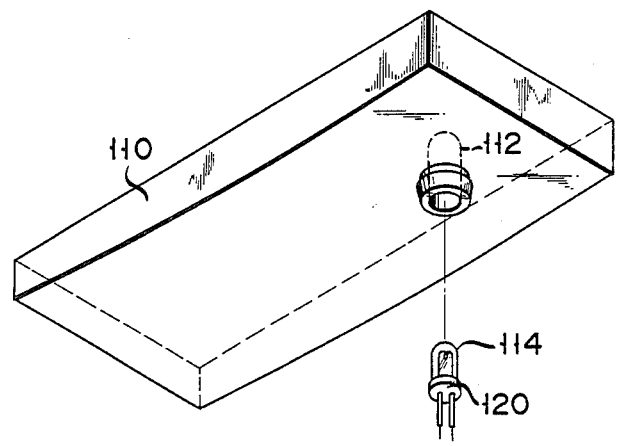
FIG. 3 is a perspective view of a display panel illumination device according to a first embodiment of the present invention.

A display panel illumination device according to a first embodiment of the present invention will be described with reference to FIGS. 3 and 4.

Light guiding member 110 is made of a transparent or translucent silicone rubber or resin having both flexibility and elasticity (a pull strength: 20 kg/cm$^2$ which permits the light guiding member 110 to be expanded two times its original length). The thickness of member 110 varies from side to side with the right side, for example being 10 mm thick and the left side being 5 mm thick. The area of the surface of the light guiding member contacting what for all intents and purposes can be liquid crystal panel 116, is predetermined. Lamp insertion hole 112 is formed in a portion of an end of the rear or lower surface of light guiding member 110. Baseless, compact, incandescent lamp 114 is inserted into hole 112.

More specifically, lamp 114 is mounted in socket 120 and therewith inserted into hole 112. Hole 112 has a diameter slightly smaller than that of lamp 114 and socket 120. By pressing lamp 114 and socket 120 into hole 112, hole 112 expands slightly due to the elasticity of member 110. By means of the elastic restoring force of member 110, lamp 114 and socket 120 are thus elastically mounted in hole 112. As a result of this elastic contractibility, even if impact or vibration is applied to the display panel illumination device, or an expansion difference between member 110 and lamp 114 occurs due to a rise in the temperature of the device, lamp 114 and socket 120 will not be removed from hole 112. Since silicone rubber or resin can be used at temperatures up to about 180° C., lamp 114 can be brought into direct contact with member 110 without fear of this latter melting or incurring damage of any kind.

The rear of lower surface of member 110 is arced upward, curving away from lamp 114. Arcuated surface 118 is constituted of an Al reflecting film or a light scattering surface such as a satin finish surface formed by sand blasting.

Fixing member 122 for fixing the display panel illumination device extends integrally with the lower surface of member 110 so as to surround hole 112. Fixing member 122 has large-diameter portion 126 at the distal end of small-diameter projection 124. As shown in FIG. 4, fixing member 122 is inserted into mounting hole 130 of mounting plate 128 for attaching the display panel illumination device, made of paper-phenol resin, or glass-epoxy resin. Since fixing member 122 can be elastically deformable, portion 126 with a protrusion is elastically fastened with hole 130, securing fixing member 122.

Figure 4:
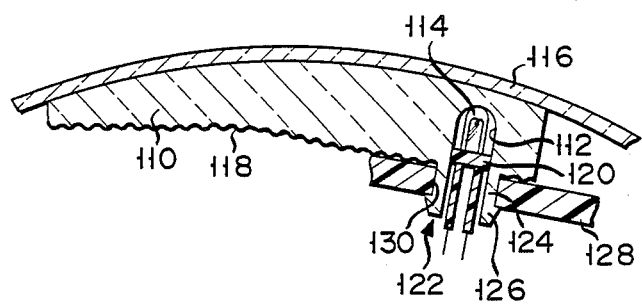
FIG. 4 is a sectional view of the illumination device of the first embodiment.

As shown in FIG. 4, when the described illumination device is mounted on arcuated panel 116, the front or upper surface of member 110 is in tight contact with the rear or lower surface of panel 116 due to its elasticity.

Light emitted from lamp 114 propagates inside member 110 and is reflected by surface 118, so that the light is illuminated through the front or upper surface of member 110 in a substantially uniform manner. Consequently, panel 116, which is in tight contact with the front or upper surface of member 110, is uniformly illuminated.

Because of its flexibility, member 110 is compatible with a variety of display panels 116, regardless of their radii of curvature. Its flexibility and compatibility combine to ensure tight contact between it and panel 116, and, moreover, facilitate use of only one type of light guiding member with all kinds of display panels.

Since member 110 is made of a flexible and elastic material, lamp 114 can be easily inserted and securely held in lamp insertion hole 112. In addition, fixing member 122 eliminates the need for other special connecting pieces, greatly simplifying the support structure for mounting plate 128. Furthermore, since silicone rubber or resin can be easily colored through the addition of a pigment, character display on display panel 116 can be performed different colors.

The present invention is not limited to the structure exemplified by the embodiment described above. In the above embodiment, lamp 114 is mounted in a portion of one end of member 110. In contrast, two lamps 114 may be mounted in portions at either end of member 110, or lamp 114 may be mounted at a central portion of member 110. Alternatively, lamp 114 may be mounted on the surface of an outer side of member 110, eliminating the need to arcuate the lower surface of member 110.

Figure 5:
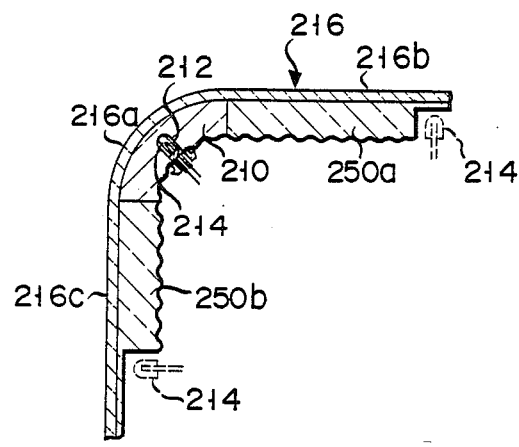
FIG. 5 is a sectional view of a display panel illumination device according to a second embodiment of the present invention.

A display panel illumination device according to a second embodiment of the present invention will be described with reference to FIG. 5. In this embodiment, nonflexible acrylic resin light guide members 250a and 250b extend from either end of arcuated silicone rubber light guide member 210. Member 210 is mounted along the inside surface of curved corner 216a of display panel 216, and members 250a and 250b are mounted on either side of member 210 along inside surfaces 216b and 216c of panel 216. Because of the elasticity of the substance of which member 210 is made, lamp 214 is inserted into and held in, in this embodiment, lamp insertion hole 212, formed in member 210, in the same fashion as in the first embodiment. As indicated by dashed lines in FIG. 5, lamps 214 may, optionally, be mounted to the sides of members 250a and 250b. This, however, necessitates the provision of an additional means by which to hold lamps 214.

Figure 6:
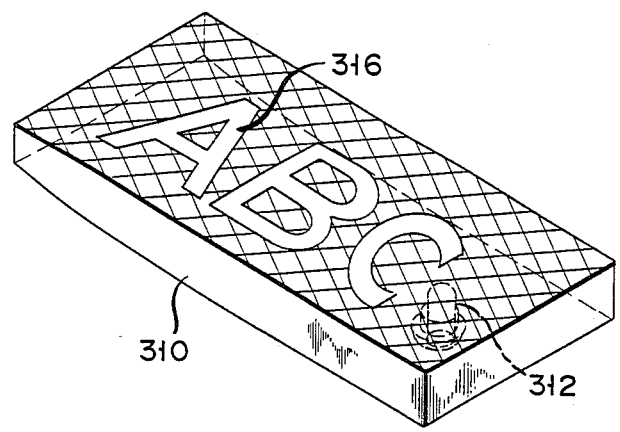
FIG. 6 is a perspective view of a display panel illumination device according to a third embodiment of the present invention.

A display panel illumination device according to a third embodiment of the present invention will be described with reference to FIG. 6. In this embodiment, predetermined display information 316 is printed directly on the surface of flexible light guiding member 310. Collectively, information 316 consists of characters and figures which may be formed on medium 310 by deposition. Lamp insertion hole 312 is formed in member 310, and, for example, a baseless, incandescent lamp is inserted into it. The device of this embodiment can be effectively utilized to directly illuminate information 316, displayed on the surface of member 310, and can also be utilized to illuminate a mask-like member or the rear surface of a liquid crystal panel.

A display panel illumination device according to a fourth embodiment of the present invention will be described with reference to FIGS. 7 and 8. Display information 416 is printed on face 460 of one end of elongated light guiding member 410. Lamp 414 is installed in a hole at the other end of member 410. This display panel illumination device, as shown in FIG. 8, can be fitted in a narrow, bent path (not shown).

Material for the light guiding member is not limited to silicone rubber or resin, but can be a flexible and elastic material such as fluorine-contained resin or fluorine-contained rubber, through which light can be transmitted. Similarly, the lamp is not limited to a baseless, incandescent lamp, but can be a lamp with a base or a low pressure discharge lamp. When a low pressure discharge lamp is used, the light guiding member can be made of a low heat resistant material, because little heat is generated by a low pressure discharge lamp. Further, the fixing member for securing the light guiding member to the mounting plate need not be formed integrally with a portion of the lamp insertion hole, but can instead be a fixing member extending from the light guiding member or a recess engaged with a projection formed on the mounting plate.

What is claimed is:

1. A display apparatus comprising:
   a transparent light guide plate made of a flexible and elastic material, said light guide plate having a light emitting surface, a light reflecting inner surface and a light source receiving hole having a predetermined inner diameter;

light source means fixed in said light source receiving hole, said light source means including a socket, and a lamp mounted in said socket which has an outer diameter slightly larger than the inner diameter of said hole so that said light source receiving hole expands due to the flexibility of said light guide plate when said lamp is inserted into said hole in order to fixedly receive said lamp in said hole; and a display panel mounted on said light emitting surface of said light guide plate, said display panel being provided with display information thereo which may be illuminated by light that is emitted from said light source and is reflected from said light reflecting inner surface.

2. The device according to claim 1, wherein said light guide plate includes a fixing member for mounting said light guide plate to a mounting member.

3. The device according to claim 2, wherein said fixing member is formed intgrally with said light guiding plate.

4. The device according to claim 1, wherein said light guide plate is made of a material selected from the group consisting of silicone rubber, silicone resin, fluorine-contaied rubber, and fluorine-contained resin.

5. A display apparatus comprising:

a transparent light guide plate made of flexible and elastic material, said light guide plate having a light emitting surface, a light reflecting inner surface and a light source receiving hole haivng a predetermined inner diameter;

light source means fixed in said light source receiving hole, said light source means including a baseless incandescent lamp which has an outer diameter slightly larger than the inner diameter of said hole so that when the lamp is pressed into the hole, the hole diameter expands slightly due to the elasticity of the light guide plate and the lamp is elastically fixed in the hole; and a display panel mounted on said light emitting surface of the light guide plate, said display panel being provided with display information which may be illuminated with light that is emitted from said lamp and is reflected from said light reflecting inner surface.

* * * * *